C. JOSEPH.
TOGGLE BOLT.
APPLICATION FILED NOV. 3, 1911. RENEWED NOV. 25, 1914.

1,145,423.

Patented July 6, 1915.

Attest:
Mary H. Jenis
Alan C. McDonnell.

Carl Joseph, Inventor:
by William R. Baird
his Atty.

UNITED STATES PATENT OFFICE.

CARL JOSEPH, OF BAYONNE, NEW JERSEY.

TOGGLE-BOLT.

1,145,423.        Specification of Letters Patent.        Patented July 6, 1915.

Application filed November 3, 1911, Serial No. 658,321. Renewed November 25, 1914. Serial No. 874,096.

*To all whom it may concern:*

Be it known that I, CARL JOSEPH, a subject of the Emperor of Germany, residing at 612 Broadway, Bayonne, in the county of Hudson and State of New Jersey, have invented certain new and useful Improvements in Toggle-Bolts, of which the following is a specification.

This invention relates to toggle bolts designed to be used in securing articles to one side of a surface inaccessible from the other side. Its novelty consists in the construction and adaptation of the parts as will be hereinafter pointed out.

Figure 1:
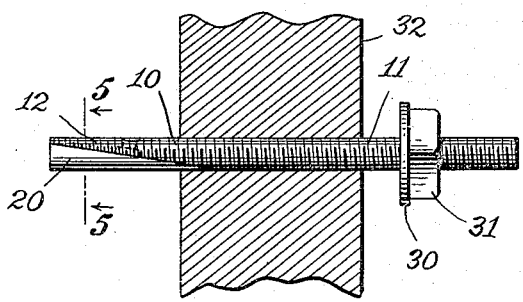
Figure 2:
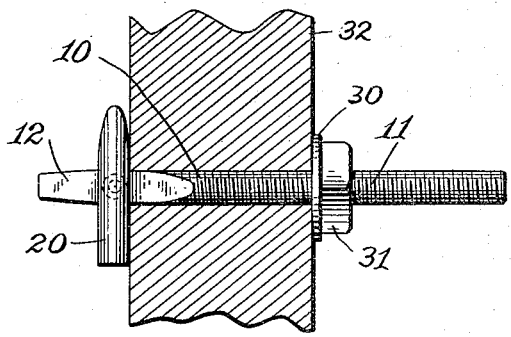
Figure 3:
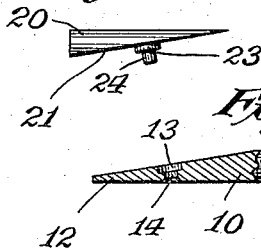
Figure 4:
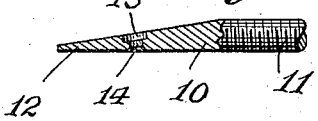
Figure 5:

In the drawings, Figure 1 represents a bolt embodying the invention; Fig. 2 represents a similar view with the drop section rotated to position to be used; Fig. 3 is an elevation of the drop section; Fig. 4 a similar view of the truncated body section, and Fig. 5 is a section on the plane of the line 5—5 of Fig. 1.

In the drawings 10 is the body of the bolt preferably threaded as indicated at 11. It is obliquely truncated at one end 12, to provide a beveled end having a single flat face that is recessed at 13 and apertured at 14. The threads preferably extend into the truncated section.

20 is the drop section which is preferably made of such size and shape that one of its sides 21 is a plane surface adapted to contact with the truncated surface of the body 10, its other sides or portions correspond to the similar portions of the body section, so that when the drop section is assembled with the body section the combined bolt is of substantially the same diameter throughout.

Projecting from the side 21 is an annular boss 23 adapted to fit in the annular recess 13 of the section 10, and projecting beyond the boss is a pin or pivot 24 adapted to fit into the aperture 14. It will be noted that the longitudinal axis of the pivot is substantially at a right angle to the side 21, and consequently also to the truncating plane of the body section 10. In assembling the parts, the drop section is pivoted on the body section and the extremity of the pivot is upset to prevent its accidental displacement. This pivot is at the center of the truncating plane so that the drop section is the same length on each side of the pivot but its tapering construction makes its outer half heavier than its inner half and consequently it will tip into the position shown in Fig. 2, when rotated so the truncating plane is substantially vertical.

30 indicates a washer and 31 a nut, each of any usual form and adapted to be used in securing any suitable device to the wall 32 against which the bolt is fastened.

In use, a hole is bored through the wall just a little larger in diameter than the body of the bolt to be inserted through it. It may be a snug fit and preferably is so constructed. The bolt with the drop section alongside of the body section as shown in Fig. 1 is then inserted in the hole in the wall and the bolt pushed through. As soon as the inner tip of the drop section has cleared the end of the hole in the wall, the drop section will rotate on its pivot under the influence of gravity, because its outer extremity is heavier than its inner end on the other side of the pivot, and when the body of the bolt is drawn back, as shown in Fig. 2, the drop section contacts with the inner surface of the wall and effectually prevents the withdrawal of the body of the bolt.

What I claim as new is:

1. A toggle bolt having a body section circular in cross sectional area and obliquely truncated at one end, forming a beveled end having a single flat face, a drop section having a flat side face in contact with the end face and a pivot connecting the sections and bridging the joint between said flat faces, and disposed at right angles to said faces, and obliquely to the longitudinal axis of the bolt.

2. A toggle bolt having a body section obliquely truncated at one end and a drop section having one side in contact with the truncated portion of the drop section, the body section having an annular bearing boss and the body section a recess adapted to fit over the same.

3. A toggle bolt having a body section obliquely truncated throughout its cross sectional area, forming a beveled end having a single flat face, and a drop section pivoted to the flat face, said drop section being substantially triangular in longitudinal section and having an outer rounded face and an
5 inner flat face that is in contact with and moves alongside the said beveled end face.

In testimony whereof I affix my signature in presence of two witnesses.

CARL JOSEPH.

Witnesses:
E. W. SCHERR, JR.,
ALAN C. McDONNELL.